United States Patent
Sayama

(10) Patent No.: US 9,106,783 B2
(45) Date of Patent: Aug. 11, 2015

(54) ABNORMAL REFLECTED LIGHT RESISTANT IMAGE READING

(71) Applicant: KYOCERA Document Solutions Inc., Osaka (JP)

(72) Inventor: Haruki Sayama, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/192,901

(22) Filed: Feb. 28, 2014

(65) Prior Publication Data
US 2014/0240796 A1    Aug. 28, 2014

(30) Foreign Application Priority Data
Feb. 28, 2013   (JP) ................... 2013-039724

(51) Int. Cl.
| | |
|---|---|
| H04N 1/60 | (2006.01) |
| H04N 1/028 | (2006.01) |
| H04N 1/00 | (2006.01) |
| H04N 1/10 | (2006.01) |
| H04N 1/40 | (2006.01) |

(52) U.S. Cl.
CPC ....... *H04N 1/02815* (2013.01); *H04N 1/00005* (2013.01); *H04N 1/02885* (2013.01); *H04N 1/1017* (2013.01); *H04N 1/40056* (2013.01)

(58) Field of Classification Search
CPC .......... H04N 1/00005; H04N 1/02845; H04N 1/02885; H04N 1/00997
See application file for complete search history.

(56) References Cited

U.S. PATENT DOCUMENTS

| | | | | |
|---|---|---|---|---|
| 6,009,215 | A * | 12/1999 | Yamada | 382/321 |
| 7,471,417 | B1 * | 12/2008 | Chien | 358/1.9 |
| 2003/0090742 | A1 * | 5/2003 | Fukuda et al. | 358/448 |
| 2007/0195379 | A1 * | 8/2007 | Suga | 358/497 |
| 2009/0002774 | A1 | 1/2009 | King et al. | |
| 2010/0118355 | A1 * | 5/2010 | Hanagata | 358/475 |
| 2010/0231762 | A1 * | 9/2010 | Shirai et al. | 348/243 |
| 2014/0043629 | A1 | 2/2014 | Shirado | |

FOREIGN PATENT DOCUMENTS

| | | |
|---|---|---|
| JP | H09-219769 A | 8/1997 |
| JP | 2004-070187 A | 3/2004 |
| JP | 2012-186515 A | 9/2012 |

* cited by examiner

*Primary Examiner* — Benny Q Tieu
*Assistant Examiner* — Haris Sabah
(74) *Attorney, Agent, or Firm* — James W. Judge

(57) ABSTRACT

An image reading apparatus includes a light emitting diode (LED), a carriage, light receiving elements, a clamp circuit, an A/D convertor, and an image correction unit. The image correction unit is configured to: detect a document area where the reflected light is abnormal by comparing first image data with second image data; and replace the first image data corresponding to the abnormal document area with third image data. The first image data is generated by movement of the carriage in a sub-scanning direction of a first direction. The second image data is generated by movement of the carriage in the sub-scanning direction of a second direction at a reduced luminescence level of the capturing light illuminated on the document compared with a luminescence level in the movement of the carriage in the first direction. The third image data is the second image data where at least brightness is adjusted.

20 Claims, 9 Drawing Sheets

Band-Generated First Image Data

Da

Second Image Data

Db

Third Image Data Cut From Second
Image Data and Level-Adjusted

Dc

Combined

Dd

ABNORMAL REFLECTED LIGHT RESISTANT IMAGE READING

CROSS-REFERENCE TO RELATED APPLICATION

This application is based upon, and claims the benefit of priority from, corresponding Japanese Patent Application No. 2013-039724 filed in the Japan Patent Office on Feb. 28, 2013, the entire contents of which are incorporated herein by reference.

BACKGROUND

Unless otherwise indicated herein, the description in this section is not prior art to the claims in this application and is not admitted to be prior art by inclusion in this section.

Generally, an image reading apparatus reads a document as follows. The image reading apparatus scans the document with light source, condenses the reflected light to a photoelectric conversion element such as a Charge Coupled Device (CCD) image sensor, and obtains an image signal corresponding to the document image. Then, an A/D convertor in an Analog Front End (AFE) performs A/D conversion on the image signal to obtain the document image data. This type of image reading apparatus employs a Cold Cathode Fluorescent Lamp (CCFL) as a light source. However, since the CCFL takes time for stabilizing luminance, the CCFL is always lit to improve a response speed. Consequently, there is a problem of causing quick deterioration. In view of this, recently, a light emitting diode (LED) is employed as a light source instead of the CCFL. The LED features low-price, long life, quick response speed, and long stabilization period. Accordingly, the LED features functionality sufficient for usual reading of documents.

SUMMARY

An image reading apparatus according to an exemplary embodiment of the disclosure includes a light emitting diode (LED), a carriage, light receiving elements, a clamp circuit, an A/D convertor and an image correction unit. The light emitting diode (LED) is configured to illuminate capturing light onto a document. The carriage is configured to receive a reflected light of the capturing light reflected by the document. The carriage is configured to move in a sub-scanning direction. The light receiving elements linearly arranged so as to read an image from the document by moving the carriage along the sub-scanning direction while receiving the reflected light of the capturing light from the carriage. The clamp circuit is configured to perform a clamping process with respect to each line of an image signal output from the light receiving elements. The A/D convertor is configured to A/D convert the clamping-processed image signal by the clamp circuit to generate image data. The image correction unit is configured to: detect a document area where the reflected light is abnormal by comparing first image data with second image data; and replace the first image data corresponding to the abnormal document area with third image data. The first image data is generated by movement of the carriage in a sub-scanning direction of a first direction. The second image data is generated by movement of the carriage in the sub-scanning direction of a second direction at a reduced luminescence level of the capturing light illuminated on the document compared with a luminescence level in the movement of the carriage in the first direction. The third image data is the second image data where at least brightness is adjusted.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
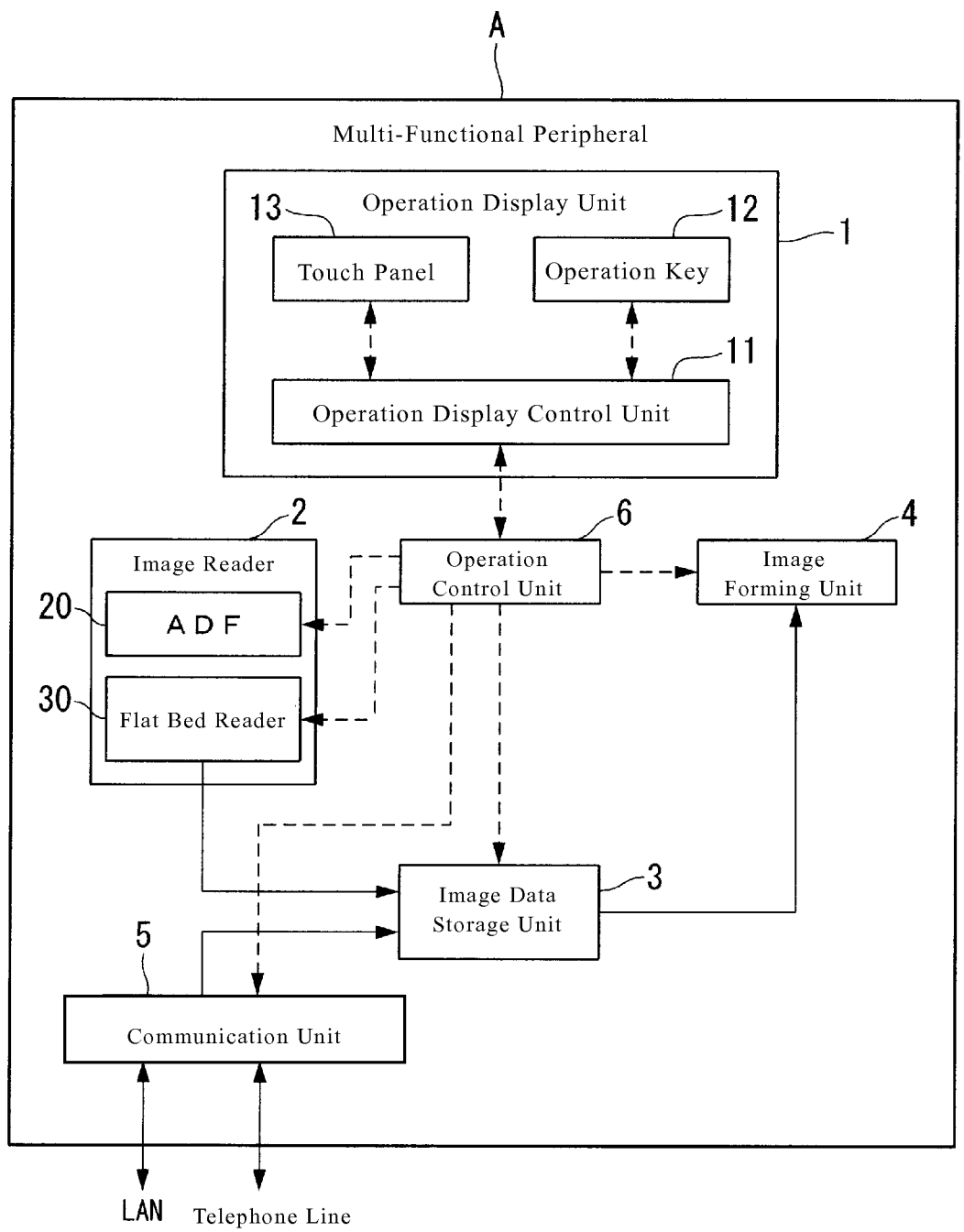
FIG. 1 is a functional block diagram of a multi-functional peripheral A according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A multi-functional peripheral A (an image forming apparatus) according to an embodiment is an image forming apparatus that forms an image on a recording sheet based on an electrophotographic system. As illustrated in FIG. 1, the multi-functional peripheral A includes an operation display unit 1, an image reader 2, an image data storage unit 3, an image forming unit 4, a communication unit 5, and an operation control unit 6 (an image correction unit). The image reader 2 and the operation control unit 6 constitute an image reading apparatus according to the embodiment. The solid line arrows in FIG. 1 indicate a data flow. The dotted line arrows in FIG. 1 indicate flows of a control signal and a detection signal.

The operation display unit 1 includes an operation display control unit 11, an operation key 12, which is a hardware key, and a touch panel 13, which displays a software key and various images. The operation display unit 1 functions as a man-machine interface that associates a user and the multifunctional peripheral A. The operation display control unit 11 is a control unit that controls the operation key 12 and the touch panel 13 under control by the operation control unit 6. The operation display control unit 11 is constituted of an arithmetic processing unit, an internal memory, an interface circuit, and a similar component. The interface circuit sends and receives signals to/from the operation key 12 and the touch panel 13, which are mutually and electrically connected. The operation display control unit 11 controls the entire operation of the operation display unit 1 based on an operation display control program stored in the internal memory.

For example, the operation display control unit 11 outputs a display signal to the touch panel 13 to display an operation button and various images on the touch panel 13. The operation display control unit 11 determines which of either the operation key 12 or the operation button displayed on the touch panel 13 has been operated, based on an operation signal input from the operation key 12 or the touch panel 13. The operation display control unit 11 then outputs an operation result signal based on the determination result to the operation control unit 6.

The operation key 12 is physically included in the operation display unit 1 as a hardware key. The operation key 12 includes a power key, a start key, a stop/clear key, a numeric keypad (a numerical value input key), or a similar key. In the operation key 12, when a user presses each of the above-described keys, an operation signal is output from each key to the operation display control unit 11.

As is well known, the touch panel 13 includes a transparent planar touch-pressure sensor of resistive film type or a similar type on a display surface of a display panel. When the operation button, which is displayed on the display panel based on a display signal input from the operation display control unit 11, is pressed by, for example, a finger of the user, the planar touch-pressure sensor outputs an operation signal indicating a pressed position (pressed coordinate) to the operation display control unit 11.

Figure 2:
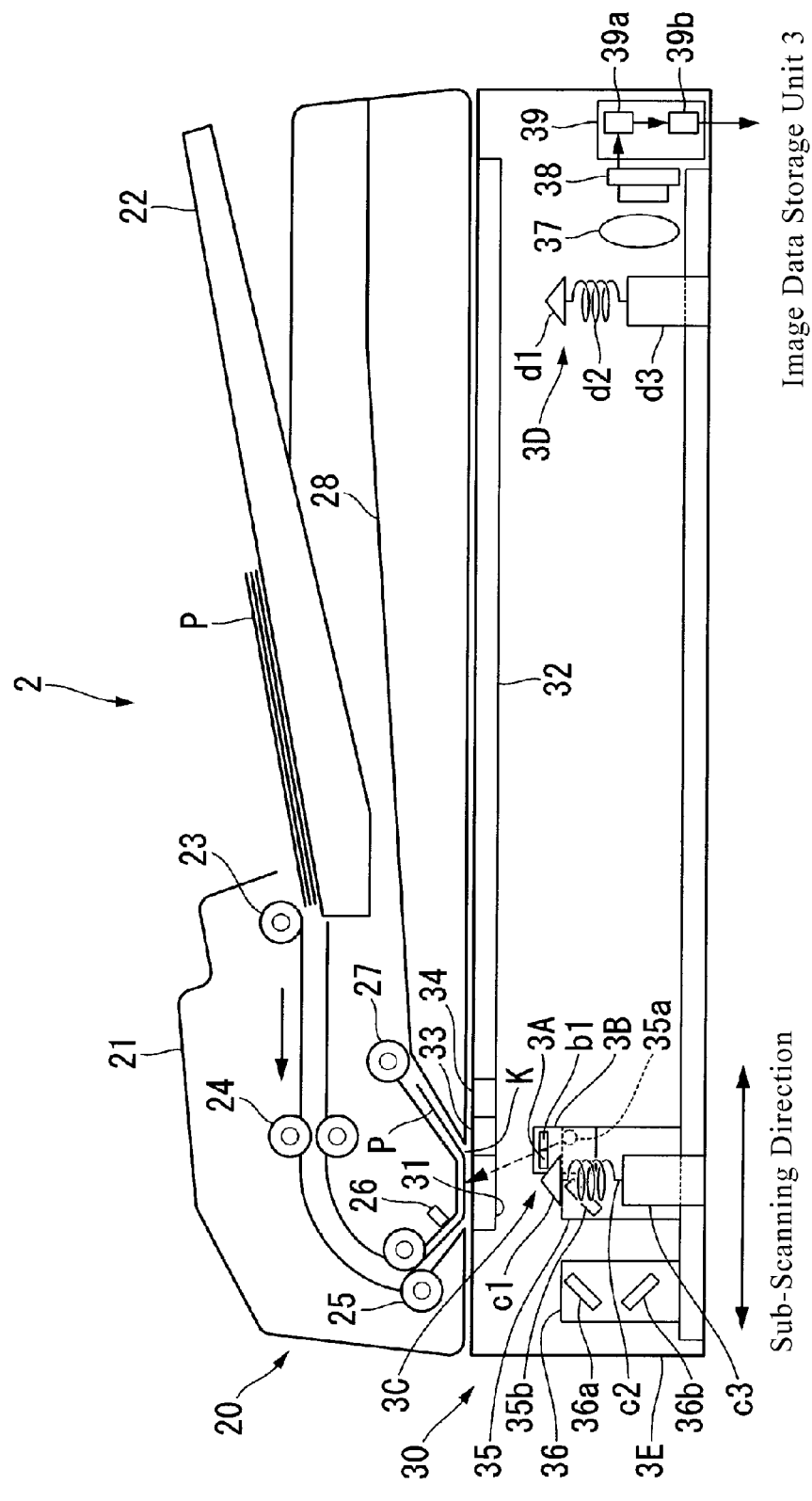
FIG. 2 is a cross-sectional view of an image reader 2 according to the multi-functional peripheral A according to the embodiment of the disclosure.

The image reader 2 is constituted of an Automatic document feeder (ADF) 20 and a flat bed reader 30 as illustrated in FIGS. 1 and 2. The image reader 2 reads a surface image (a document image) of a document P fed by the ADF 20 based on a control signal input from the operation control unit 6 or the document P placed on the flat bed reader 30 by the user, converts the surface image into document image data, and outputs the document image data to the image data storage unit 3. The dotted line arrow illustrated in FIG. 2 indicates an optical path for capturing light illuminated onto the document P, which is automatically fed by the ADF 20.

The ADF 20 automatically and sequentially feeds a plurality sheets of the document P placed on a document feed tray 22 to a reading position of the document image sheet by sheet basis. As illustrated in FIG. 2, the ADF 20 includes a platen cover 21, the document feed tray 22, a pickup roller 23, a conveying roller 24, a registration roller 25, a document detecting unit 26, a sheet discharge roller 27, and a document discharge tray 28.

The platen cover 21 is a movable cover mounted on the main body of the ADF 20 so as to be freely open and close. The platen cover 21 is a cover for removing the document P jammed in the middle of sheet feed, or for a similar purpose. While FIG. 2 illustrates a state where the platen cover 21 is closed, the user is accessible to the pickup roller 23, the conveying roller 24, the registration roller 25, or a similar member by opening the platen cover 21. The document feed tray 22 is a tray for placing the document P as a reading target.

The pickup roller 23 is a drive roller that picks up the document P housed at the document feed tray 22 sheet by sheet basis and sends out the document P to the conveying roller 24. The conveying roller 24 is a drive roller that conveys the document P supplied from the pickup roller 23 to the registration roller 25. The registration roller 25 is a drive roller that sends out the document P supplied from the conveying roller 24 to the sheet discharge roller 27 at a predetermined time point.

Between the registration roller 25 and the sheet discharge roller 27, a reading opening K is formed as illustrated in the drawing. The reading opening K is a strip-shaped opening with a predetermined width in a sub-scanning direction (a document conveyance direction) located at the bottom portion of the ADF 20, that is, an opposed portion of the flat bed reader 30. The reading opening K is a part where the surface of the document P automatically fed by the ADF 20 is exposed to the flat bed reader 30. Between the reading opening K and the registration roller 25, the document detecting unit 26 is located.

The document detecting unit 26 detects a distal end position of the document P sent out from the registration roller 25 and outputs the detection signal to the operation control unit 6. The sheet discharge roller 27 is a drive roller that conveys the document P supplied from the registration roller 25 to the document discharge tray 28. The document discharge tray 28 is a housing unit that houses the document P supplied from the sheet discharge roller 27.

Figure 3:
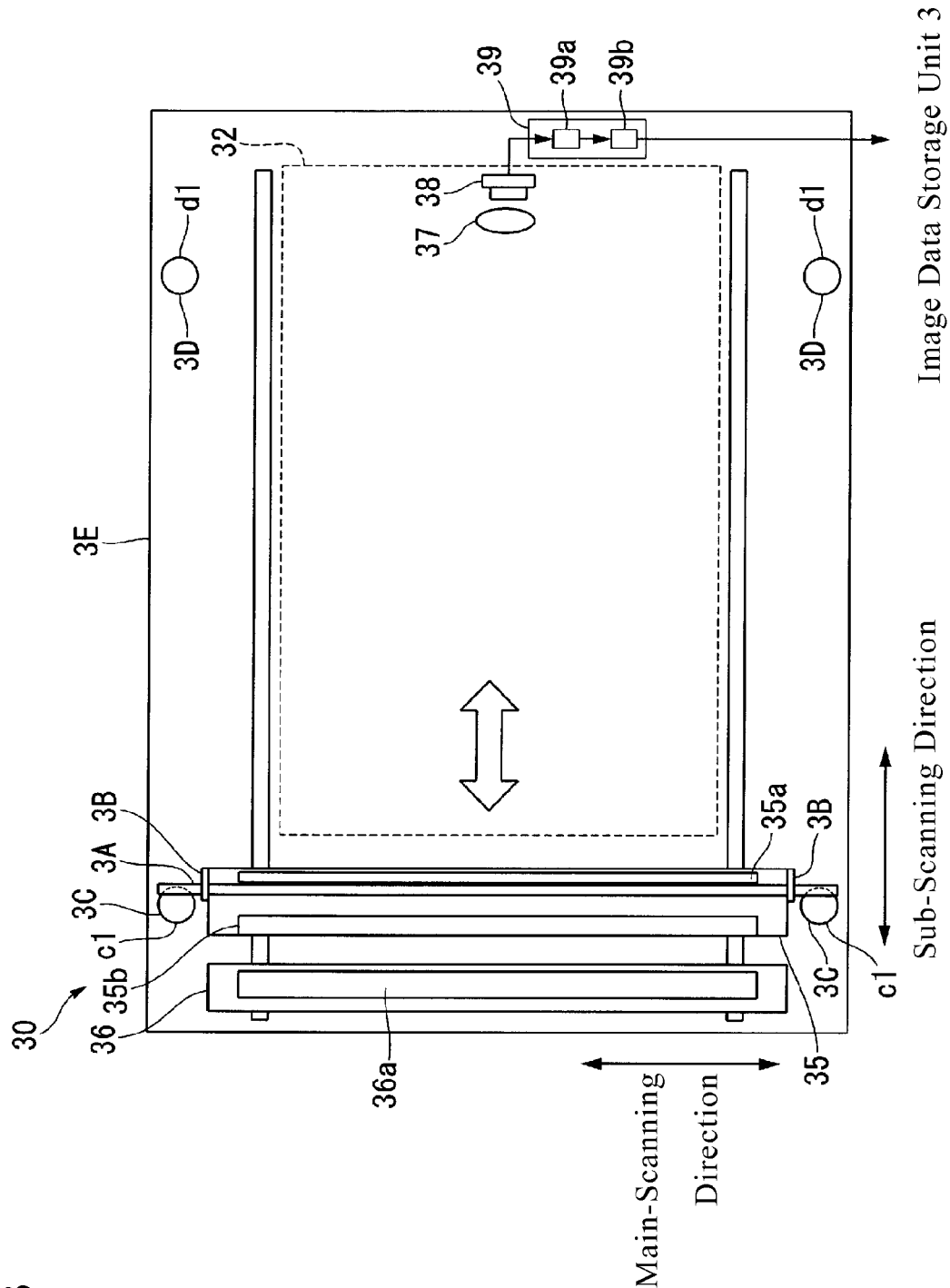
FIG. 3 is a plan view illustrating an inside of a flat bed reader 30 according to one embodiment of the disclosure.

As illustrated in FIGS. 2 and 3, the flat bed reader 30 includes a first platen glass 31, a second platen glass 32, a white reference board 33, a document size indication plate 34, a full rate carriage 35, a half rate carriage 36, a condenser lens 37, Charge Coupled Device (CCD) line sensor 38, an Analog Front End (AFE) 39, the dimming element 3A, a supporting unit 3B, a first contact unit 3C, a second contact unit 3D, and a reading unit housing 3E. The flat bed reader 30 reads the document P automatically fed by the ADF 20 or the document P placed on the second platen glass 32 by the user.

The first platen glass 31 is a transparent sheet glass engaged to the strip-shaped opening located at the left side of the top surface of the reading unit housing 3E. The first platen glass 31 is opposed to the above-described reading opening K of the ADF 20. A plurality sheets of the document P sequentially conveyed from the registration roller 25 to the sheet discharge roller 27 of the ADF 20 sequentially passes on the first platen glass 31. The second platen glass 32 is a transparent sheet glass engaged to a rectangular opening. The rectangular opening is located on the right side of the strip-shaped opening to which the first platen glass 31 is engaged. In an image reading process without the ADF 20, the user places the document P on the second platen glass 32.

The white reference board 33 is located between the first platen glass 31 and the second platen glass 32 on the top surface of the reading unit housing 3E. The white reference board 33 is a white board that provides a reference color employed for well-known shading correction. The document size indication plate 34 is located between the second platen glass 32 and the white reference board 33 on the top surface of the reading unit housing 3E. The document size indication plate 34 includes a mark indicating a placing position according to a document size when the user places the document P on the second platen glass 32.

The full rate carriage 35 includes a Light Emitting Diode (an LED) 35a and a first mirror 35b. The LED 35a is a light source that emits capturing light toward diagonally upward (the dotted line arrow in FIG. 2). The first mirror 35b reflects capturing light reflected by the document P to the half rate carriage 36. The full rate carriage 35 is movably located on a rail extending in the sub-scanning direction. The plurality of LEDs 35a are arranged along the direction that the full rate carriage 35 extends (a main-scanning direction). When the document P automatically fed by the ADF 20 is read, the full rate carriage 35 is secured below the first platen glass 31 as illustrated in FIG. 2. Then, the full rate carriage 35 illuminates capturing light, which is emitted from the LED 35a, onto the document P passing through the reading opening K on the first platen glass 31 and reflects capturing light reflected on the surface of the document P to the half rate carriage 36 by the first mirror 35b.

Meanwhile, when reading the document P placed on the second platen glass 32, the full rate carriage 35 illuminates capturing light onto the document P while moving rightward in the sub-scanning direction below the second platen glass 32. The full rate carriage 35 simultaneously reflects capturing light, which is sequentially obtained from the document P, to the half rate carriage 36 with the first mirror 35b. When the full rate carriage 35 moves to the right end, the full rate carriage 35 then moves leftward and returns to an initial position before starting the movement. Thus, when reading the document P placed on the second platen glass 32, the full rate carriage 35 moves outbound and incoming in the sub-scanning direction where a moving path to the right direction is outbound path and the moving path to the left direction is incoming path. In this embodiment, the outbound-path movement of the full rate carriage 35 corresponds to the movement of the carriage in the sub-scanning direction of the first direction. The incoming-path movement of the full rate carriage 35 corresponds to the movement of the carriage in the sub-scanning direction of the second direction.

The half rate carriage 36 includes a second mirror 36a and a third mirror 36b. The second mirror 36a reflects capturing light entered from the first mirror 35b downward. The third mirror 36b reflects capturing light entered from the second mirror 36a to the condenser lens 37. The half rate carriage 36 is located on the left side of the full rate carriage 35 on the same rail as the full rate carriage 35. To read the document P automatically fed by the ADF 20, the half rate carriage 36 is secured on the left of the full rate carriage 35, which is located below the first platen glass 31, away by a predetermined distance from the full rate carriage 35 as illustrated in FIG. 2. Meanwhile, to read the image of the document P set on the second platen glass 32, similarly to the full rate carriage 35, the half rate carriage 36 moves outbound and incoming in the sub-scanning direction.

The condenser lens 37 condenses the capturing light entered from the third mirror 36b and forms an image on a light receiving surface of the CCD line sensor 38. The CCD line sensor 38 is a line sensor with a predetermined number of linearly (a line pattern) arranged CCD light receiving elements. The CCD line sensor 38 photoelectrically converts the capturing light sequentially received on the light receiving surface into an image signal, which is an electric signal, and outputs the image signal to an AFE 39. The AFE 39 includes a clamp circuit 39a and an A/D convertor 39b. The clamp circuit 39a performs a clamping process on each one line of image signals input from the CCD line sensor 38. The A/D convertor 39b performs A/D conversion on the image signals on which the clamping process is performed. The AFE 39 outputs the image data (the document image data) digitized by the A/D convertor to the image data storage unit 3.

The dimming element 3A is made of a material such as semitransparent synthetic resin. The dimming element 3A is supported by the supporting unit 3B at the full rate carriage 35 so as to be slidable in the sub-scanning direction. Locating the dimming element 3A between the LED 35a and the document P placed on the second platen glass 32 reduces a luminescence level of the capturing light illuminated from the LED 35a onto the document P.

That is, the full rate carriage 35 moves to the distal end of the outbound path (the moving path to the right direction) in the above-described outbound/incoming movements and then the dimming element 3A contacts the second contact unit 3D located at the distal end. Accordingly, the dimming element 3A slides into between the LED 35a and the document P (the position where the LED 35a is covered from upward) and reduces a luminescence level of the capturing light illuminated from the LED 35a onto the document P. Meanwhile, after the full rate carriage 35 moves to the distal end in the incoming path (the moving path to the left direction), the dimming element 3A contacts the first contact unit 3C located at the distal end. Accordingly, the dimming element 3A slides to the position away from between the LED 35a and the document P. Consequently, the luminescence level of the capturing light illuminated from the LED 35a onto the document P is recovered. A detailed mechanism that the dimming element 3A slides in the sub-scanning direction will be described later.

The supporting unit 3B is a pair of supporting members located at each of both ends of the full rate carriage 35 in the main-scanning direction. Each supporting unit 3B supports the dimming element 3A and includes a guide rail b1 along the sub-scanning direction. The guide rail b1 guides the dimming element 3A in the sub-scanning direction. The guide rail b1 is formed to have a length so that the dimming element 3A may be movable into between the LED 35a and the document P (the position covering the LED 35a from upward) and to the position away from between the LED 35a and the document P. While being guided by the guide rail b1, the dimming element 3A slides on the full rate carriage 35 in the sub-scanning direction.

The first contact unit 3C is located at one side (a left end) among both ends in an outbound/incoming movement range of the full rate carriage 35 and outside of the rail on which the full rate carriage 35 moves in the reading unit housing 3E. The first contact units 3C are paired opposed in the main-scanning direction. The first contact units 3C each include a contact member c1, an elastic member c2, and a supporting member c3.

The contact member c1 is formed in a conical shape. The inferior surface of the contact member c1 is biased to the upper direction with the elastic member c2 so as to be the same height position as a height position of the dimming element 3A. The elastic member c2 is, for example, a spirally coiled cylinder spring. The elastic member c2 is supported from the lower side by the supporting member c3 and gives upward biasing force to the inferior surface of the contact member c1. The supporting member c3 is located at the inner bottom surface of the reading unit housing 3E and supports the elastic member c2.

The second contact unit 3D is located at the right in the outbound/incoming movement range of the full rate carriage 35 and outside of the rail on which the full rate carriage 35 moves in the reading unit housing 3E. The second contact units 3D are paired opposed in the main-scanning direction, and the second contact units 3D each include a contact member d1, an elastic member d2, and a supporting member d3, similarly to the first contact unit 3C. Thus, the second contact unit 3D is formed of functional components (the contact member, the elastic member, and the supporting member), which are the same as those of the first contact unit 3C.

Therefore, descriptions of the functional components in the second contact unit 3D are omitted.

The reading unit housing 3E is a boxed housing that houses the above-described full rate carriage 35, a half rate carriage 36, the condenser lens 37, the CCD line sensor 38, the AFE 39, the dimming element 3A, the supporting units 3B, the first contact unit 3C, and the second contact unit 3D.

The image data storage unit 3 is semiconductor memory, a hard disk drive, or a similar device. The image data storage unit 3 stores document image data generated by the image reader 2 based on a control signal input from the operation control unit 6, print image data that the communication unit 5 receives from an external client computer, or facsimile image data that the communication unit 5 receives from an external facsimile. The image data storage unit 3 also reads these image data based on the control signal input from the operation control unit 6 and outputs the image data to the image forming unit 4.

Figure 4:
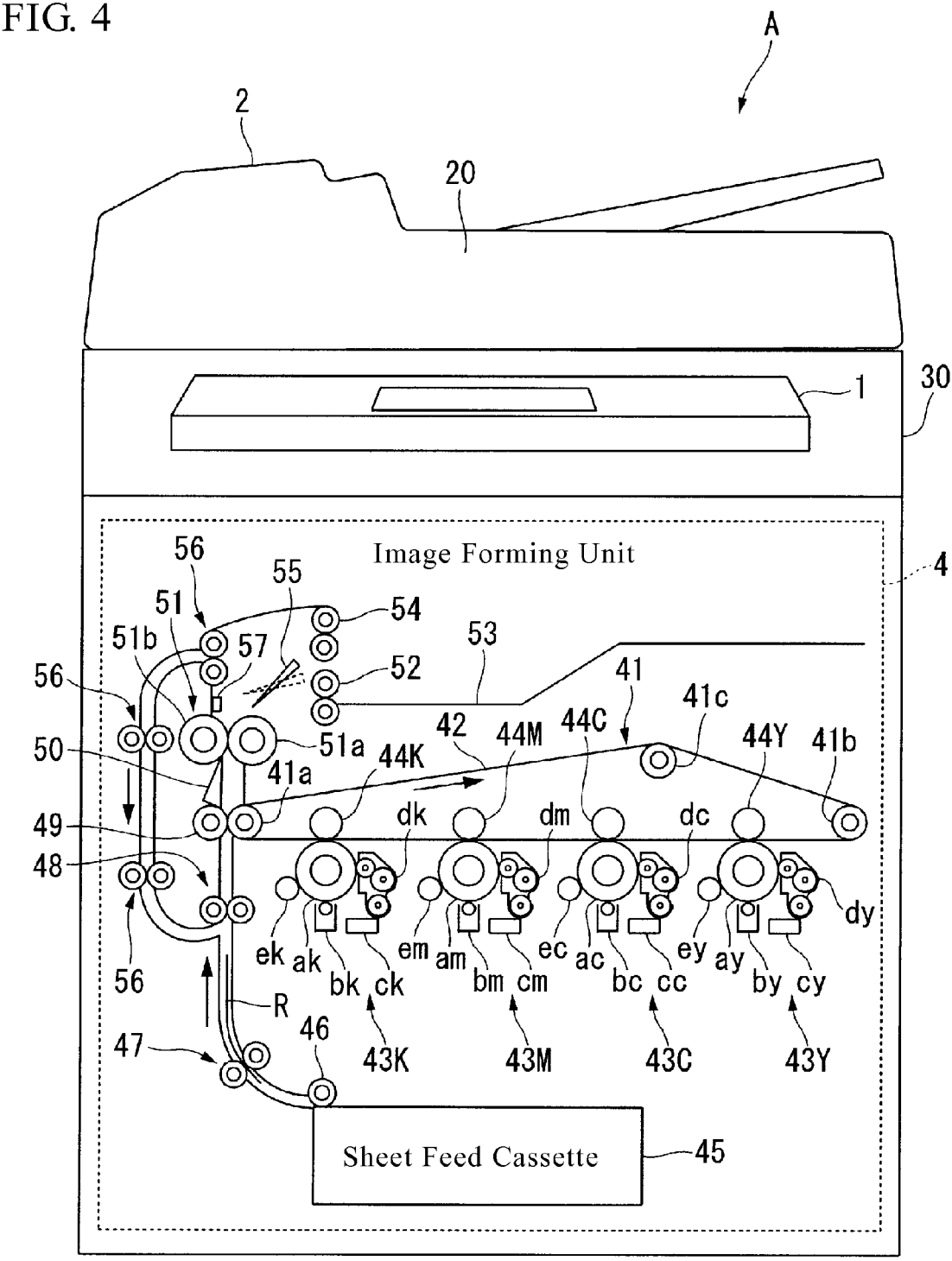
FIG. 4 is a schematic view illustrating a mechanical configuration of an image forming unit 4 according to one embodiment of the disclosure.

The image forming unit 4 forms a toner image based on the image data read from the image data storage unit 3 on a recording sheet R extracted from a sheet feed cassette 45 (see FIG. 4) based on the control signal input from the operation control unit 6. As illustrated in FIG. 4, this image forming unit 4 includes a belt roller 41, an intermediate transfer belt 42, four image forming units 43Y, 43C, 43M, and 43K, which correspond to respective toner colors (Y, M, C, K), primary transfer rollers 44Y, 44C, 44M, and 44K, the sheet feed cassette 45, a pickup roller 46, a conveying roller 47, a registration roller 48, a secondary transfer roller 49, a separation static electricity removing unit 50, a fixing roller 51, a sheet discharge roller 52, a sheet discharge tray 53, a reverse roller 54, a branch guide 55, three pairs of inverted paper sheet conveying rollers 56, and a recording sheet sensor 57.

As illustrated in the drawing, the belt roller 41 includes three rollers arranged separately, namely, a drive roller 41a, a driven roller 41b, and a tension roller 41c. That is, the drive roller 41a and the driven roller 41b are located with a constant distance horizontally. The tension roller 41c is located between the drive roller 41a and the driven roller 41b, and at a position slightly displaced upwardly. The intermediate transfer belt 42 is an endless belt bridged across the belt roller 41 (the drive roller 41a, the driven roller 41b, and the tension roller 41c) and is run by the drive roller 41a in the direction indicated by the arrow.

That is, the intermediate transfer belt 42 horizontally runs between the drive roller 41a and the driven roller 41b. The above-described drive roller 41a is a roller to which a shaft of a motor that generates a driving force is coupled. The drive roller 41a causes the intermediate transfer belt 42 to run in the arrow direction by motor power. The driven roller 41b is a free roller disposed for free rotation and guides the intermediate transfer belt 42 in accordance with power generated by the drive roller 41a. The tension roller 41c includes a movable rotation shaft. The tension roller 41c presses the intermediate transfer belt 42 at a predetermined biasing force to add constant tension to the intermediate transfer belt 42.

As illustrated in the drawing, the image forming units 43Y, 43C, 43M, and 43K are located at the horizontal running parts with predetermined intervals on the above-described intermediate transfer belt 42. Among these image forming units 43Y, 43C, 43M, and 43K, the image forming unit 43Y forms a yellow (Y) toner image and is located at the closest position to the driven roller 41b. The image forming unit 43C forms a cyan (C) toner image and is located at the closest position to the driven roller 41b next to the image forming unit 43Y. The image forming unit 43M forms a magenta (M) toner image and is located at the closest position to the driven roller 41b next to the image forming unit 43C. The image forming unit 43K forms a black (K) toner image and is located at the closest position to the drive roller 41a.

The image forming units 43Y, 43C, 43M, and 43K include respective photoreceptor drums ay, ac, am, and ak, respective charging units by, bc, bm, and bk, respective laser scanning units cy, cc, cm, and ck, respective developing units dy, dc, dm, and dk, and respective cleaners ey, ec, em, and ek as components.

That is, the image forming unit 43Y includes the photoreceptor drum ay, the charging unit by, the laser scanning unit cy, the developing unit dy, and the cleaner ey. The image forming unit 43C includes the photoreceptor drum ac, the charging unit bc, the laser scanning unit cc, the developing unit dc, and the cleaner ec. The image forming unit 43M includes the photoreceptor drum am, the charging unit bm, the laser scanning unit cm, the developing unit dm, and the cleaner em. The image forming unit 43K includes the photoreceptor drum ak, the charging unit bk, the laser scanning unit ck, the developing unit dk, and the cleaner ek.

Each photoreceptor drum ay, ac, am, and ak is a cylindrical member whose peripheral surface is made of a predetermined photoreceptor material (such as amorphous silicon). Each of the charging units by, bc, bm, and bk uniformly charges the peripheral surface (the light-sensitive surface) of each of the photoreceptor drums ay, ac, am, and ak. Each of the laser scanning units cy, cc, cm, and ck illuminates laser beam on the charged light-sensitive surface to form an electrostatic latent image on the light-sensitive surface.

Each of the developing units dy, dc, dm, and dk internally houses a predetermined amount of toner (a positive polarity toner). Each of the developing units dy, dc, dm, and dk supplies the toner to the light-sensitive surface to develop the electrostatic latent image formed on the light-sensitive surface as a toner image. Each of the cleaners ey, ec, em, and ek scrapes off to remove a toner (a remaining toner) remaining on the light-sensitive surface after transferring the toner image.

As illustrated in the drawing, the four primary transfer rollers 44Y, 44C, 44M, and 44K are disposed corresponding to the image forming units 43Y, 43C, 43M, and 43K. Each of the primary transfer rollers 44Y, 44C, 44M, and 44K is arranged opposed to the photoreceptor drums ay, ac, am, and ak of each image forming unit 43Y, 43C, 43M, and 43K so as to sandwich the intermediate transfer belt 42. A primary transfer bias of negative polarity (high voltage) is applied to each of the primary transfer rollers 44Y, 44C, 44M, and 44K. Each of the primary transfer rollers 44Y, 44C, 44M, and 44K transfers (primary transfer) toner images of each color formed on each of the photoreceptor drums ay, ac, am, and ak of the image forming units 43Y, 43C, 43M, and 43K, respectively, onto the intermediate transfer belt 42 by an action of the primary transfer bias.

The sheet feed cassette 45 is a container that houses a plurality of stacked recording sheets R with a predetermined shape, such as A4 size and B5 size. The pickup roller 46 is located at the top of the sheet feed cassette 45 so as to press against the recording sheet R. The pickup roller 46 is a roller that picks up the recording sheets R in the sheet feed cassette 45 sheet by sheet basis and sends out the recording sheet R to the conveying roller 47. The conveying roller 47 is a roller that conveys the recording sheet R fed from the pickup roller 46 to the registration roller 48. The registration roller 48 is a roller that supplies the recording sheet R supplied from the conveying roller 47 to the secondary transfer roller 49 at a predetermined time point.

The secondary transfer roller 49 is arranged opposed to the drive roller 41*a* sandwiching the intermediate transfer belt 42. The secondary transfer roller 49 transfers (secondary transfer) the toner image on the intermediate transfer belt 42 to the recording sheet R. A secondary transfer bias of negative polarity (high voltage) is applied to the secondary transfer roller 49. The secondary transfer roller 49 transfers (secondary transfer) the toner image on the intermediate transfer belt 42 to the recording sheet R by an action of the secondary transfer bias.

The separation static electricity removing unit 50 supplies a discharging bias of positive polarity to the recording sheet R based on the control signal input from the operation control unit 6. This discharging bias is to neutralize a charge on the recording sheet R to make the recording sheet R in a non-charged state, thus properly separating the recording sheet R from the secondary transfer roller 49. The separation static electricity removing unit 50 includes a saw-teeth-shaped electrode made of stainless. An electric field is generated from the distal end of the saw-teeth-shaped electrode and diselectrify the recording sheet R.

The fixing roller 51 includes a heating roller 51*a*, which internally includes a heater, and a pressure roller 51*b*, which presses against the heating roller 51*a*. This fixing roller 51 sandwiches the recording sheet R, on which toner images of respective colors are transferred, with the heating roller 51*a* and the pressure roller 51*b* to heat and pressurize the recording sheet R, thus fixing the toner images of respective colors on the recording sheet R. The heating roller 51*a* and the pressure roller 51*b* are made of a fluorine-based material where the contact surface (the surface) contacting the recording sheet R is charged in negative polarity by friction. That is, the surfaces of the heating roller 51*a* and the pressure roller 51*b* are charged in negative polarity by friction with the recording sheet R.

The sheet discharge roller 52 conveys the recording sheet R, which is conveyed from the fixing roller 51 and guided by the branch guide 55, to the sheet discharge tray 53. The sheet discharge tray 53 is a housing unit that houses and holds the recording sheet R supplied from the sheet discharge roller 52. The reverse roller 54 reversely conveys the recording sheet R conveyed from the fixing roller 51 and guided by the branch guide 55. That is, the reverse roller 54 sandwiches the recording sheet R supplied from the fixing roller 51 by normal rotation and reversely conveys the sandwiched recording sheet R to the inverted paper sheet conveying roller 56 by reverse rotation.

The branch guide 55 alternatively switches a conveyance destination of the recording sheet R discharged from the fixing roller 51 to the sheet discharge roller 52 or the reverse roller 54 based on the control signal input from the operation control unit 6. That is, in the case where the recording sheet R is discharged to the sheet discharge tray 53, the branch guide 55 has a first posture (a posture of the dotted line illustrated in FIG. 4) to set the conveyance destination of the recording sheet R to the sheet discharge roller 52. Meanwhile, the branch guide 55 has a second posture (a posture of the solid line illustrated in FIG. 4) to switch the conveyance destination of the recording sheet R to the reverse roller 54.

The inverted paper sheet conveying roller 56 is located at a conveying path (inverting path) to convey the recording sheet R supplied from the reverse roller 54 to the registration roller 48. This inverted paper sheet conveying rollers 56 are disposed at three positions separated at the inverted path as illustrated in FIG. 4. The recording sheet sensor 57 is located between the fixing roller 51 and the branch guide 55. The recording sheet sensor 57 detects a number of recording sheets R passing through the fixing roller 51 and outputs a detection signal indicating the number of sheets to the operation control unit 6.

Here, in double-sided image formation where toner images are formed on the front surface and the reverse surface of the recording sheet R, functioning the reverse roller 54, the branch guide 55, and the inverted paper sheet conveying roller 56 supplies the recording sheet R, which has passed through the fixing roller 51 for image formation on the front surface, to the registration roller 48 again with the front surface and the reverse surface inverted. This forms the image on the reverse surface of the recording sheet R.

The communication unit 5 communicates with the external multi-functional peripheral A or a facsimile via a telephone line based on the control signal input from the operation control unit 6 or communicates with a client computer or a similar device via a Local Area Network (LAN). That is, this communication unit 5 has both a communication function in accordance with a LAN standard such as Ethernet (a registered trademark) and a communication function in accordance with a facsimile standard such as G3.

The operation control unit 6 includes a Central Processing Unit (CPU), a Read Only Memory (ROM), a Random Access Memory (RAM), and an interface circuit, which sends and receives various signals among units electrically connected one another, and similar component. This operation control unit 6 performs various arithmetic processing based on various operation control programs stored in the ROM and communicates with each unit to control the overall operation of the multi-functional peripheral A. As a part of various control processes, when the operation control unit 6 detects a document area with an abnormal reflected light in the image data in reading the document P placed on the flat bed reader 30, the operation control unit 6 corrects the abnormal document area. The details will be described later.

Next, operations of the multi-functional peripheral A thus configured will be described. First, the overall operation of the multi-functional peripheral A will be described. For example, the user places the document P with unevenness and gloss, such as a credit card, on the second platen glass 32 of the flat bed reader 30 and operates the operation display unit 1 to instruct the document P to be copied. The operation signal related to this instruction is input from the operation display unit 1 to the operation control unit 6. Consequently, the operation control unit 6 causes the image reader 2 to perform an image reading process to read the document P.

That is, the operation control unit 6 moves the full rate carriage 35 and the half rate carriage 36 to the sub-scanning direction and drives the LED 35*a* to illuminate the capturing light onto the document P. Consequently, the capturing light is reflected by the document P, sequentially reflected by the subsequent first mirror 35*b*, second mirror 36*a*, and third mirror 36*b*, and introduced into the condenser lens 37. The condenser lens 37 condenses the capturing light onto the light receiving surface of the CCD line sensor 38.

Then, the operation control unit 6 drives the CCD line sensor 38 to cause the CCD line sensor 38 to receive the capturing light. Then, the operation control unit 6 causes the AFE 39 to convert an image signal, which is output from the CCD line sensor 38, into digitalized document image data and causes the image data storage unit 3 to store the document image data. Afterwards, the operation control unit 6 causes the image forming unit 4 to perform an image forming process of the document image based on the document image data stored in the image data storage unit 3.

Figure 5:
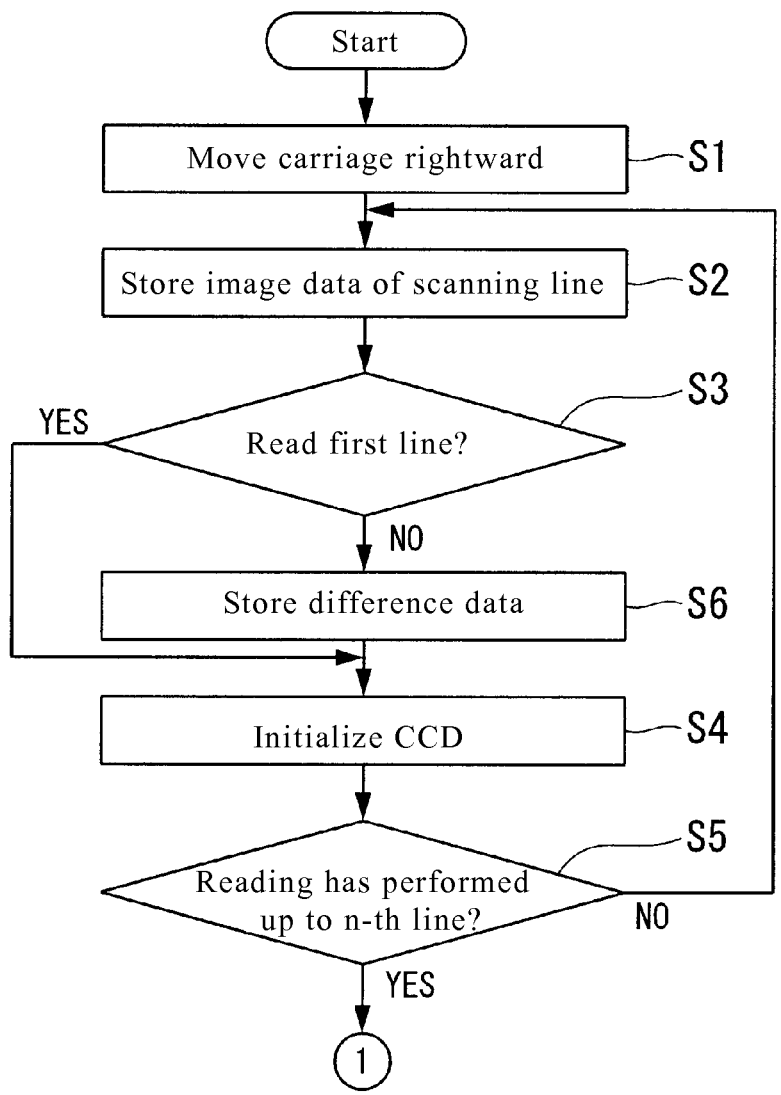
FIG. 5 is a flowchart illustrating operations of the multi-functional peripheral A according to one embodiment of the disclosure.
Figure 6:
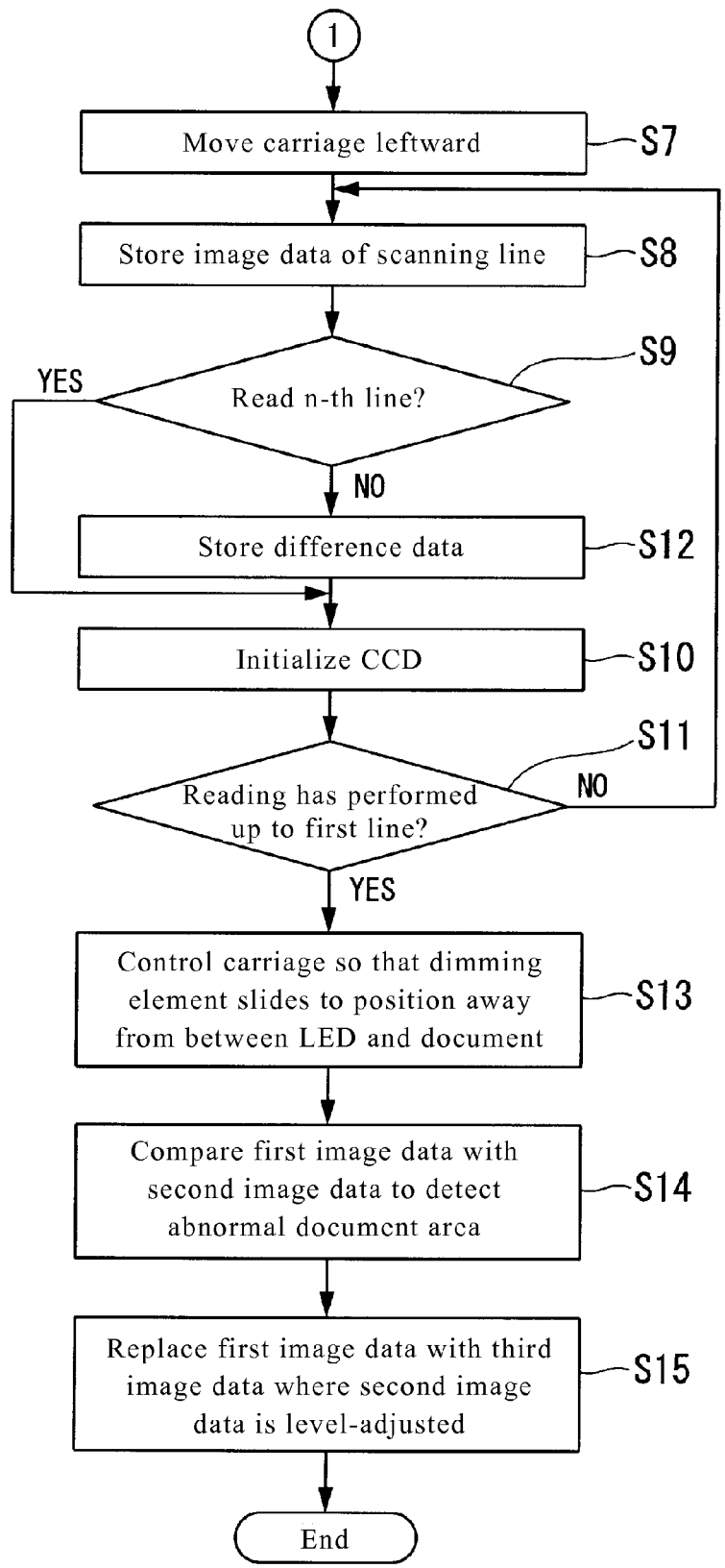
FIG. 6 is a flowchart illustrating operations of the multi-functional peripheral A according to one embodiment of the disclosure.

Here, the operation control unit 6 performs the following distinctive processes when causing the above-described image reading processes to be performed. That is, the operation control unit 6 corrects the document image data as illustrated in the flowcharts in FIGS. 5 and 6. Specifically, first, the operation control unit 6 rotatably drives a carriage drive motor (not illustrated) in the outbound path direction to read the image of the document P placed on the second platen glass 32. Then, the operation control unit 6 starts movement of the full rate carriage 35 and the half rate carriage 36, which are stopped at a predetermined initial position at the left end of the rail, to the right direction (Step S1).

For example, as illustrated in FIGS. 2 and 3, the initial position is the position of the full rate carriage 35 where both ends of the dimming element 3A disposed at the full rate carriage 35 are located on the right side of the contact member c1 of the first contact unit 3C. In this respect, the dimming element 3A is located at the left end of the guide rail b1 of the supporting unit 3B, that is, at the position away from between the LED 35a and the document P (the position away from upward of the LED 35a). The mechanism where the dimming element 3A is set at the position away from between the LED 35a and the document P will be described later.

Subsequently, the operation control unit 6 moves the full rate carriage 35 and the half rate carriage 36 rightward and drives the LED 35a and the CCD line sensor 38 while the dimming element 3A is located at the position away from between the LED 35a and the document P. Then, the operation control unit 6 causes the CCD line sensor 38 to read the document image sequentially from the first line, the second line, and then the third line up to the last n-th line of the scanning line in the main-scanning direction and causes the image data storage unit 3 to store first image data obtained as a result of the reading.

Specifically, first, when the capturing light reflected by the document P is received by the CCD line sensor 38 and the image signal of the first line is output, the operation control unit 6 causes the AFE 39 to convert the image signal into digitalized image data and causes the image data storage unit 3 to store the image data of the first line (Step S2). Thus, the operation control unit 6 causes the image data storage unit 3 to store the image data of the scanning line in the main-scanning direction in the process of Step S2.

Subsequently, the operation control unit 6 determines whether the currently executed reading of the document P is reading of the first line or not (Step S3). Here, when the operation control unit 6 determines that the first line is read (determined as YES), the operation control unit 6 causes the CCD line sensor 38, from which the image signal of first line is output, to perform initialization (Step S4). A description will be given of a process of Step S6, which is performed when the determination process at Step S3 is determined as NO, will be described in the reading process of the second or later line.

Subsequently, the operation control unit 6 determines whether the reading is performed up to the last n-th line or not (Step S5). The operation control unit 6 determines that the reading has not performed up to the last n-th line (determined as NO), returns to the process at Step S2, and reads the next line, that is, the second line. When the operation control unit 6 causes the CCD line sensor 38 to output the image signal of the second line at the process of Step S2, the operation control unit 6 causes the AFE 39 to perform A/D conversion on the image signal and causes the image data storage unit 3 to store the digitalized image data of the second line.

Then, the operation control unit 6 determines that the first line is not read at the determination process in the above-described Step S3 (determined as NO), the operation control unit 6 generates difference data indicating a difference in level between the image data of the first line and the image data of the second line stored in the image data storage unit 3 and causes the image data storage unit 3 to store the difference data (Step S6). The difference data indicates at least a difference in level of brightness among brightness, contrast, and gamma. Thus, the operation control unit 6 generates the difference data indicative of the difference in level between the scanning lines neighboring in the main-scanning direction at the process in Step S6 and causes the image data storage unit 3 to store the difference data.

When, for example, the operation control unit 6 reads the third line, the operation control unit 6 generates the difference data indicative of the difference in level between the image data of the second line and the image data of the third line at the process in Step S6. That is, the operation control unit 6 creates the difference data indicative of the difference in level between the scanning line read at the previous process and the scanning line currently read at the process in Step S6.

Then, after the process at Step S6, the operation control unit 6 causes the CCD line sensor 38, which has output the image signal of the second line at the process in Step S4, to perform initialization. Subsequently, the operation control unit 6 determines that the reading has not performed up to the last n-th line at the determination process in Step S5 (determined as NO), returns to the process at Step S2, and reads the next line, that is, the third line.

Subsequently, to read the third line to the last n-th line, the operation control unit 6 repeatedly performs processes at Steps S2 to S6. As a result, the image data storage unit 3 stores n pieces of image data from the first line to the n-th line in the first image data and the n−1 pieces of difference data in the first image data.

Then, after reading the last n-th line image data, the operation control unit 6 determines that the reading has performed up to the last n-th line at the determination process in Step S5 (determined as YES), and proceeds to the process in Step S7. That is, after completion of the reading up to the last n-th line, the operation control unit 6 rotatably drives the carriage drive motor (not illustrated) in the opposite direction to start moving the full rate carriage 35 and the half rate carriage 36 leftward, to the predetermined initial position at the left end of the rail (Step S7).

Figure 7A:
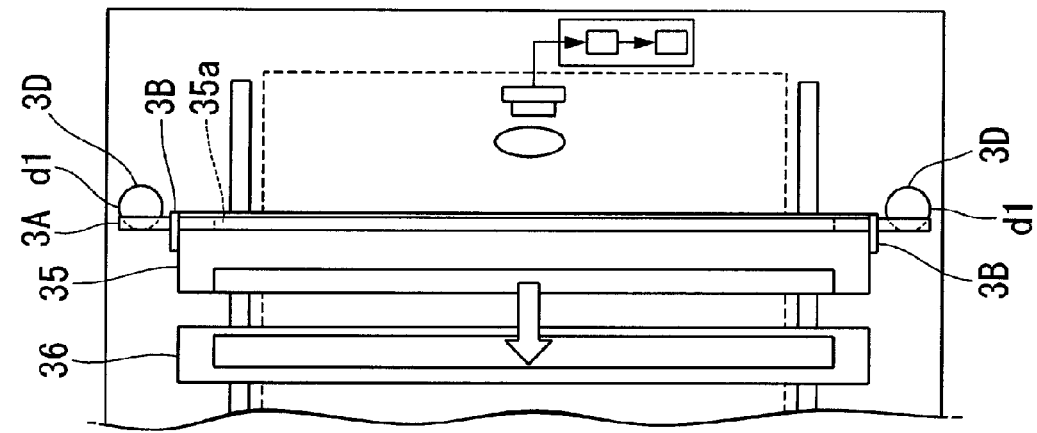
FIGS. 7A to 7C illustrate a process of sliding a dimming element 3A according to one embodiment of the disclosure.

The process in Step S7 slides the dimming element 3A to the right end of the guide rail b1 in the supporting unit 3B, namely, between the LED 35a and the document P (the position where the LED 35a is covered from upward). Here, the mechanism for sliding the dimming element 3A, which is away from between the LED 35a and the document P, into between the LED 35a and the document P will be described. As illustrated in FIG. 7A, before the full rate carriage 35 returns, that is, while the full rate carriage 35 moves rightward, the dimming element 3A is contacted and pressed by the contact member d1 of the second contact unit 3D from the right side. However, since the dimming element 3A is positioned at the left end of the guide rail b1 in the supporting unit 3B, the dimming element 3A is not slid.

Figure 7B:
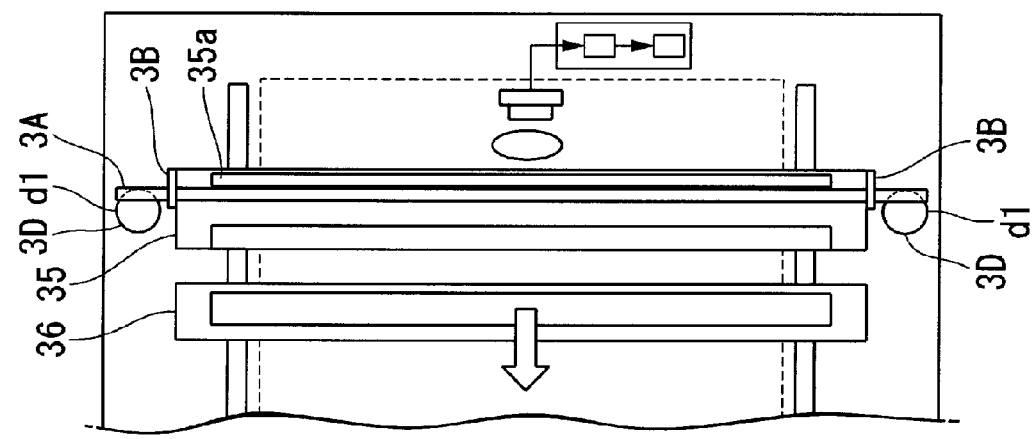

Then, when the full rate carriage 35 moves further rightward, the dimming element 3A passes on the contact member d1 while pressing down the contact member d1, which is supported from the lower side by the elastic member d2, and moves to the right side of the contact member d1 of the second contact unit 3D as illustrated in FIG. 7B.

Figure 7C:
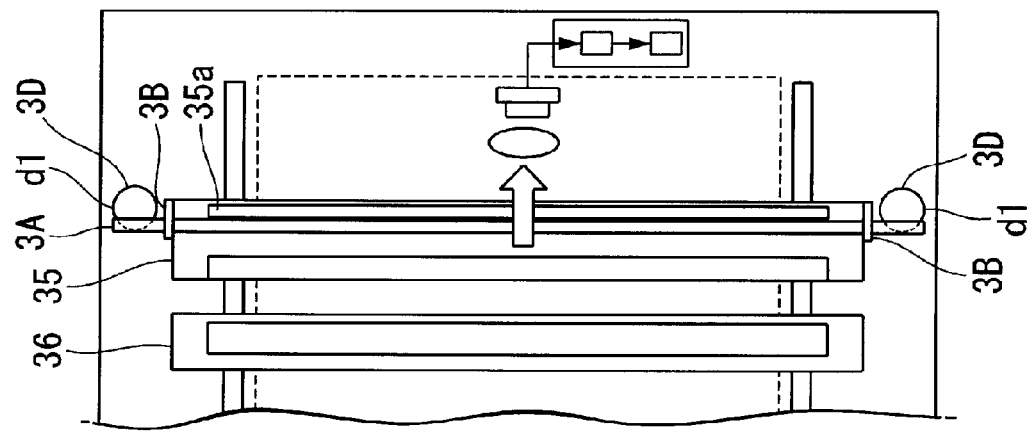

Afterwards, the full rate carriage 35 starts moving leftward at the process in Step S7. When the full rate carriage 35 starts moving leftward, the dimming element 3A is contacted by the contact member d1 of the second contact unit 3D from the left side. As a result, the dimming element 3A slides from the left end to the right end of the guide rail b1 in the supporting unit 3B, that is, into between the LED 35a and the document P (the position where the LED 35a is covered from upward). Then, when the full rate carriage 35 moves further leftward, the dimming element 3A passes on the contact member d1 while pressing down the contact member d1 and moves to the left side of the contact member d1 of the second contact unit 3D as illustrated in FIG. 7C.

Subsequently, the operation control unit 6 drives the LED 35a and the CCD line sensor 38 while moving the full rate carriage 35 and the half rate carriage 36 leftward in a state where the dimming element 3A is located between the LED 35a and the document P, that is, an amount of capturing light illuminated onto the document P is reduced compared with the outbound path. Then, the operation control unit 6 causes the CCD line sensor 38 to read the image on the document P sequentially from the n-th line, n−1-th line, and n−2-th line of the scanning line in the main-scanning direction up to the last first line. Then, the operation control unit 6 causes the image data storage unit 3 to store second image data obtained a result of the reading.

Specifically, first, when the capturing light reflected by the document P is received by the CCD line sensor 38 and the image signal of the n-th line is output, the operation control unit 6 causes the AFE 39 to convert the image signal into digitalized image data and causes the image data storage unit 3 to store the image data of the n-th line (Step S8). Thus, the operation control unit 6 causes the image data storage unit 3 to store the image data of the scanning line in the main-scanning direction in the process of Step S8.

Subsequently, the operation control unit 6 determines whether the currently executed reading of the document P is reading of the n-th line or not (Step S9). Here, when the operation control unit 6 determines that the n-th line is read (determined as YES), the operation control unit 6 causes the CCD line sensor 38, from which the image signal of n-th line is output, to perform initialization (Step S10). A description will be given of a process of Step S12, which is performed when the determination process at Step S9 is determined as NO, will be described in the reading process of the n−1-th line or later line.

Subsequently, the operation control unit 6 determines whether the reading is performed up to the last first line or not (Step S11). The operation control unit 6 determines that the reading has not performed up to the last first line (determined as NO), returns to the process at Step S8, and reads the next line, that is, the n−1-th line. When the CCD line sensor 38 outputs the image signal of the n−1-th line at the process of Step S8, the operation control unit 6 causes the AFE 39 to perform A/D conversion on the image signal and causes the image data storage unit 3 to store the digitalized image data of the n−1-th line.

Then, the operation control unit 6 determines that the n-th line is not read at the determination process in the above-described Step S9 (determined as NO), the operation control unit 6 generates difference data indicating a difference in level (difference of brightness level) between the image data of the n−1-th line and the image data of the n-th line stored in the image data storage unit 3 and causes the image data storage unit 3 to store the difference data (Step S12). Thus, the operation control unit 6 generates the difference data indicative of the difference in level between the scanning lines neighboring in the main-scanning direction at the process in Step S12 and causes the image data storage unit 3 to store the difference data.

When, for example, the operation control unit 6 reads the n−2-th line, the operation control unit 6 generates the difference data indicative of the difference in level between the image data of the n−2-th line and the image data of the n−1-th line at the process in Step S12. That is, the operation control unit 6 creates the difference data indicative of the difference in level between the scanning line read at the previous process and the scanning line currently read at the process in Step S12.

Then, after the process at Step S12, the operation control unit 6 causes the CCD line sensor 38, which has output the image signal of the n−1-th line at the process in Step S10, to perform initialization. Subsequently, the operation control unit 6 determines that reading has not performed up to the last first line at the determination process in Step S11 (determined as NO), returns to the process at Step S8, and reads the next line, that is, the n−2-th line.

Subsequently, to read the n−2-th line to the last first line, the operation control unit 6 repeatedly performs processes at Steps S8 to S12. As a result, the image data storage unit 3 stores n pieces of image data from the n-th line to the first line in the second image data and the n−1 pieces of difference data in the second image data.

Then, after reading the last first line image data, the operation control unit 6 determines that the reading has performed up to the last first line at the determination process in Step S11 (determined as YES), and proceeds to the process in Step S13. After completion of the reading up to the last first line, the operation control unit 6 controls the full rate carriage 35, which has moved to near the initial position at the left end of the rail, so that the dimming element 3A slides to a position away from between the LED 35a and the document P (Step S13).

Figure 8C:
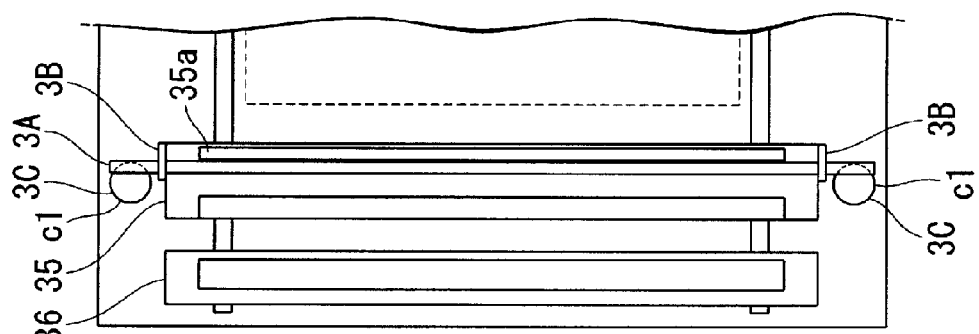
FIGS. 8A to 8C illustrate a process of sliding the dimming element 3A according to one embodiment of the disclosure.

As a result of performing the process in Step S13, the dimming element 3A slides to the left end of the guide rail b1 in the supporting unit 3B, that is, the position away from between the LED 35a and the document P. Here, a description will be given of the mechanism for sliding the dimming element 3A between the LED 35a and the document P to the position away from between the LED 35a and the document P. As illustrated in FIG. 8A, when the full rate carriage 35 moves leftward, the dimming element 3A is contacted and pressed by the contact member c1 of the first contact unit 3C from the left side. However, since the dimming element 3A is positioned at the right end of the guide rail b1 in the supporting unit 3B, the dimming element 3A is not slid.

Figure 8B:
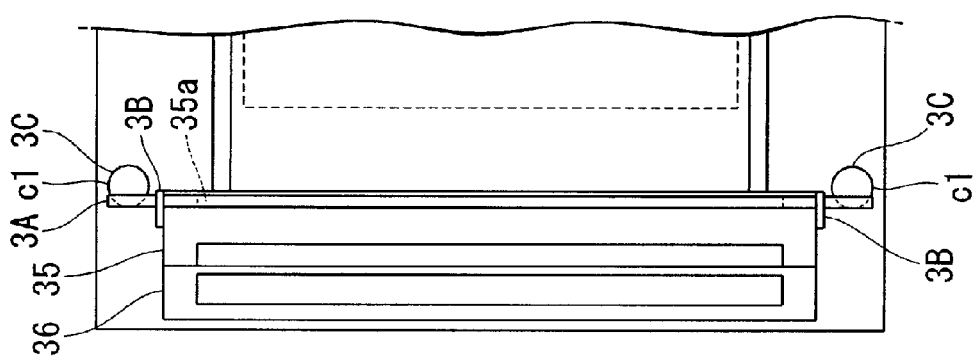
Figure 8A:
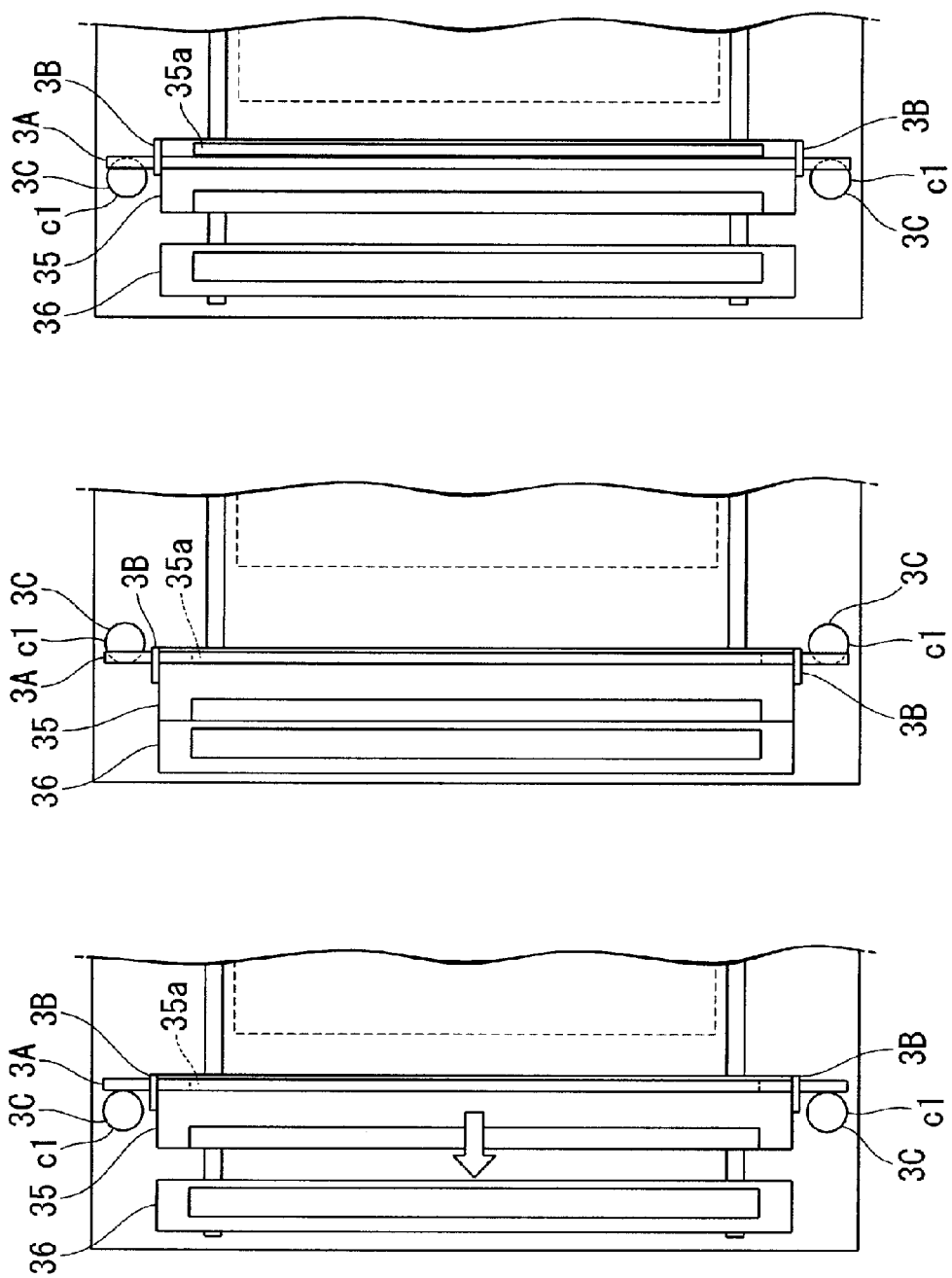

Then, after contact with the contact member c1 of the first contact unit 3C, when the full rate carriage 35 moves further leftward, the dimming element 3A passes on the contact member c1 while pressing down the contact member c1 supported from the lower side by the elastic member c2, and moves to the left side of the first contact unit 3C as illustrated in FIG. 8B.

Afterwards, the full rate carriage 35 starts moving rightward to the initial position. When the full rate carriage 35 starts moving rightward, the dimming element 3A is contacted by the contact member c1 of the first contact unit 3C from the right side. As a result, the dimming element 3A slides from the right end to the left end of the guide rail b1 in the supporting unit 3B, that is, the position away from between the LED 35a and the document P. Then, when the full rate carriage 35 moves further rightward, the dimming element 3A passes on the contact member c1 while pressing down the contact member c1 and moves to the right side of the contact member c1 of the first contact unit 3C as illustrated in FIG. 8C. The full rate carriage 35 stops at the initial position illustrated in FIG. 8C.

Subsequently, the operation control unit 6 compares the first image data, which is read by moving the full rate carriage 35 rightward (outbound path movement in the sub-scanning direction) with the second image data, which is read by moving the full rate carriage 35 leftward (incoming path movement in the sub-scanning direction) and reducing the luminescence level of the capturing light illuminated onto the document P than the outbound path. Thus, the document area with an abnormal reflected light is detected (Step S14).

Specifically, the operation control unit 6 compares the difference data in the first image data (the difference data generated at the process in Step S6) with the difference data in the second image data (the difference data generated at the process in Step S12) one by one basis. Accordingly, the operation control unit 6 detects the scanning line of the first image data with an abnormal reflected light (which is a scanning line of the first image data different from the second image data where the difference exceeds a predetermined threshold). In this respect, the operation control unit 6 may compare the image data (fourth image data) where the difference data in the second image data is level-adjusted (is brightened, for example) with the difference data of the first image data. In level adjustment, it is only necessary that the operation control unit 6 adjusts at least brightness among brightness adjustment, contrast adjustment, and gamma adjustment.

Subsequently, the operation control unit 6 replaces the first image data corresponding to the error-detected document area with the image data where the second image data is level-adjusted (the third image data) (Step S15). That is, the operation control unit 6 replaces the first image data corresponding to the scanning line where the difference in level exceeds the predetermined threshold with the image data where the second image data is level-adjusted. The level adjustment also includes at least brightness adjustment among brightness adjustment, contrast adjustment, and gamma adjustment.

Figure 9:
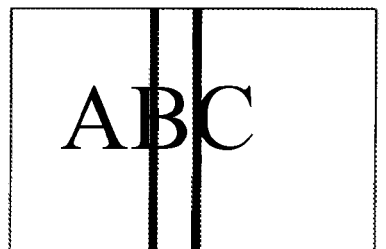
FIG. 9 illustrates a flow of correcting first image data of one embodiment according to the disclosure.
Figure 9:
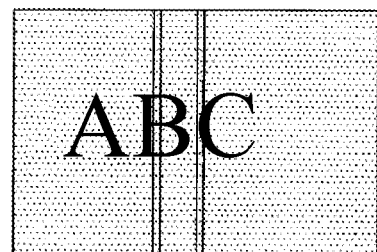
Figure 9:
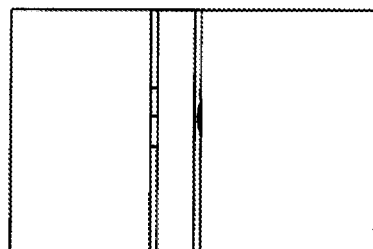
Figure 9:
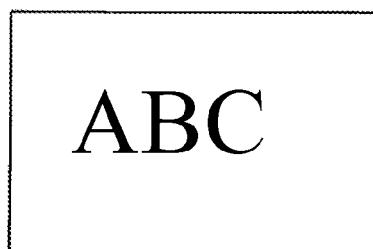

In the case where, for example, the plastic document P with unevenness and gloss, such as a credit card, is read, the glossed uneven surface condenses the reflected light of high directivity to a specific point of the CCD line sensor 38. Accordingly, as illustrated in FIG. 9, a band of the reflected light occurs along the main-scanning direction as the abnormal document area of the first image data Da. This is because that an analog signal (image signal) input to the AFE 39 from the CCD line sensor 38 exceeds an assumed operating range of the clamp circuit 39*a* of the AFE 39.

To correct the band generated in the first image data, the operation control unit 6 obtains the second image data Db where a luminescence level of the capturing light is reduced in the incoming path compared with a luminescence level in the outbound path as illustrated in FIG. 9. Then, as illustrated in FIG. 9, the operation control unit 6 cuts the part at the same position as the document area with the abnormal reflected light (the scanning line) detected at the process in Step S14 from the second image data Db. The operation control unit 6 adjusts the level of the cut image data Dc, and combines the cut image data Dc with the first image data Da as illustrated in FIG. 9. Consequently, the first image Da is corrected as illustrated in FIG. 9. Then, the operation control unit 6 causes the image forming unit 4 to perform an image forming process based on the thus corrected first image data Dd.

With this embodiment, the full rate carriage 35 detects document areas where the reflected light is abnormal by comparing the first image data read by outbound-path movement of the full rate carriage 35 in the sub-scanning direction, with second image data (or fourth image data) read by incoming-path movement of the full rate carriage 35 in the sub-scanning direction at a luminescence level of the capturing light illuminated on the document, which is reduced below that of the outbound path. The first image data corresponding to the abnormal document area is then replaced by the image data of the level-adjusted second image data (the third image data). Accordingly, even in the case where the document with unevenness and gloss is read, normal image data can be obtained.

While the embodiments of the disclosure have been described, the disclosure is not limited to the embodiments and, for example, the following modifications can be considered.

(1) While in the embodiment, the dimming element 3A is located between the LED 35*a* and the document P to reduce the luminescence level of the capturing light illuminated from the LED 35*a* onto the document P, the disclosure is not limited to this. For example, the operation control unit 6 may reduce electric power supplied to the LED 35*a* in the incoming path of the full rate carriage 35 in the sub-scanning direction compared with a luminescence level in the outbound path to reduce a luminescence amount of the LED 35*a*. Thus, the luminescence level of the capturing light illuminated onto the document P may be reduced.

(2) While in the embodiment, the operation control unit 6 compares the difference data in the first image data and the difference data in the second image data to detect the scanning line (the document area) in the first image data with an abnormal reflected light, the disclosure is not limited to this. For example, the operation control unit 6 may compare the first image data with the second image data (or image data where the second image data is level-adjusted) with respect to each scanning line so as to detect the scanning line (the document area) of the first image data with an abnormal reflected light.

(3) While the embodiment applies the disclosure to one where the LED 35*a* is mounted on the full rate carriage 35, the disclosure is not limited to this. For example, the disclosure may be applied to the image reader 2 configured as follows. The LED 35*a* is secured in the reading unit housing 3E rather than the carriage. Light emitted by the LED 35*a* is reflected by a mirror disposed at the carriage, and the capturing light is illuminated onto the document P.

(4) While in the embodiment the contact member c1 of the first contact unit 3C and the contact member d1 of the second contact unit 3D are formed in a conical shape, the contact member c1 and the contact member d1 may have a hemisphere shape instead of the conical shape. The elastic member d2 may be rubber or a similar member as well as a spring. Further, as the first contact unit 3C and the second contact unit 3D, a bar-shaped rubber or a similar member with the same height as the dimming element 3A may be installed.

(5) In the embodiment, the full rate carriage 35 obtains the first image data in outbound-path movement in the sub-scanning direction, and the full rate carriage 35 obtains the second image data in inbound-path movement in the sub-scanning direction at a reduced luminescence level of the capturing light compared with a luminescence level in the outbound path movement. However, the full rate carriage 35 may obtain the second image data in outbound-path movement in the sub-scanning direction at a reduced luminescence level of the capturing light, and the full rate carriage 35 may obtain the first image data in inbound-path movement in the sub-scanning direction at restored luminescence level of the capturing light.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus, comprising:
a light emitting diode (LED) configured to direct capturing light onto a document;
a carriage configured to receive reflected light of the capturing light reflected by the document, the carriage being configured to move back and forth along a sub-scanning path;
light receiving elements linearly arranged so as to read an image from the document by moving the carriage along the sub-scanning path while receiving the reflected light of the capturing light from the carriage;
a clamp circuit configured to perform a clamping process with respect to each line of an analog image signal output from the light receiving elements;
an analog-to-digital convertor configured to convert the analog image signal clamping-processed by the clamp circuit into a digital signal to generate image data output as document image data; and
an image correction unit configured to:
detect document areas where the reflected light is abnormal by comparing first image data generated by movement of the carriage along the sub-scanning path in a first direction, with second image data generated by movement of the carriage along the sub-scanning path in a second direction at a reduced luminescence level of the capturing light directed on the document compared with capturing-light luminescence level in the movement of the carriage in the first direction, and
replace any first image data corresponding to an abnormal document area with third image data, the third image data being generated by adjusting at least brightness of any second image data corresponding to the abnormal document area.

2. The image reading apparatus according to claim 1, further comprising a dimming element in the carriage, the dimming element being slidable along the sub-scanning path, the dimming element being semitransparent and reducing the luminescence level of the capturing light directed on the document by being positioned between the LED and the document; wherein
the dimming element is configured to slide into between the LED and the document after the carriage moves to a path distal end in the first direction, and slide into a position away from between the LED and the document after the carriage moves to a path distal end in the second direction.

3. The image reading apparatus according to claim 1, wherein the image correction unit is configured to reduce the luminescence level of the capturing light directed on the document by reducing electric power supplied to the LED in the movement of the carriage in the second direction compared with electric power supplied to the LED in the movement of the carriage in the first direction.

4. The image reading apparatus according to claim 1, wherein the image correction unit is configured to detect document areas where the reflected light is abnormal by comparing the first image data with the second image data with respect to each scanning line in a main-scanning direction.

5. The image reading apparatus according to claim 1, wherein the image correction unit is configured to detect document areas where the reflected light is abnormal by comparing difference data indicative of at least a difference in level of brightness between neighboring scanning lines in a main-scanning direction in the first image data, with such difference data for the second image data.

6. The image reading apparatus according to claim 1, wherein the image correction unit is configured to compare fourth image data with difference data indicative of at least a difference in level of brightness between neighboring scanning lines in a main-scanning direction in the first image data to detect document areas where the reflected light is abnormal, the fourth image data being generated by adjusting at least brightness of the difference data in the second image data.

7. An image forming apparatus, comprising:
the image reading apparatus according to claim 1; and
an image forming unit configured to form images based on document image data output by the image reading apparatus.

8. An image forming method using the image reading apparatus according to claim 1, comprising forming an image based on document image data output by the image reading apparatus.

9. An image reading method, comprising:
directing capturing light onto a document;
receiving reflected light of the capturing light reflected by the document using a carriage;
reading an image from the document by moving the carriage back and forth along a sub-scanning path using light receiving elements linearly arranged;
performing a clamping process with respect to each line of an analog image signal output from the light receiving elements;
converting the clamping-processed analog image signal into a digital signal to generate image data output as document image data; and
detecting document areas where the reflected light is abnormal by comparing first image data generated by movement of the carriage along the sub-scanning path in a first direction, with second image data generated by the movement of the carriage along the sub-scanning path in a second direction at a reduced luminescence level of the capturing light directed on the document compared with capturing-light luminescence level in the movement of the carriage in the first direction, and replacing any first image data corresponding to an abnormal document area with third image data, the third image data being generated by adjusting at least brightness of any second image data corresponding to the abnormal document area.

10. The image reading method according to claim 9:
wherein the detecting uses a dimming element in the carriage, the dimming element being slidable along the sub-scanning path, the dimming element being semitransparent and reducing the luminescence level of the capturing light directed on the document by being positioned between the LED and the document; and
wherein the method includes:
sliding the dimming element into between the LED and the document after the carriage moves to a path distal end in the first direction, and
sliding into a position away from between the LED and the document after the carriage moves to a path distal end in the second direction.

11. The image reading method according to claim 9, wherein the detecting includes reducing the luminescence level of the capturing light directed on the document by reducing electric power supplied to the LED in the movement of the carriage in the second direction compared with electric power supplied to the LED in the movement of the carriage in the first direction.

12. The image reading method according to claim 9, wherein the detecting includes detecting document areas where the reflected light is abnormal by comparing the first image data with the second image data with respect to each scanning line in a main-scanning direction.

13. The image reading method according to claim 9, wherein the detecting includes detecting document areas where the reflected light is abnormal by comparing difference data indicative of at least a difference in level of brightness between neighboring scanning lines in a main-scanning direction in the first image data, with such difference data for the second image data.

14. The image reading apparatus according to claim 9, wherein the detecting includes comparing fourth image data with difference data indicative of at least a difference in level of brightness between neighboring scanning lines in a main-scanning direction in the first image data to detect document areas where the reflected light is abnormal, the fourth image data being generated by adjusting at least brightness of the difference data in the second image data.

15. A non-transitory computer-readable recording medium storing an image reading program for an image reading apparatus to generate image data, the image reading apparatus including
 a light emitting diode (LED) configured to direct capturing light onto a document,
 a carriage configured to receive reflected light of the capturing light reflected by the document, the carriage being configured to move back and forth along a sub-scanning path,
 light receiving elements linearly arranged on the carriage so as to read an image from the document by moving the carriage along the sub-scanning path while receiving the reflected light of the capturing light from the carriage,
 a clamp circuit configured to perform a clamping process with respect to each line of an analog image signal output from the light receiving elements, and
 an analog-to-digital convertor configured to convert the analog image signal clamping-processed by the clamp circuit into a digital signal to generate the image data,
the image reading program causing a computer to function as an image correction unit configured to:
 detect document areas where the reflected light is abnormal by comparing first image data generated by movement of the carriage along the sub-scanning path in a first direction, with second image data generated by the movement of the carriage along the sub-scanning path in a second direction at a reduced luminescence level of the capturing light directed on the document compared with capturing-light luminescence level in the movement of the carriage in the first direction; and
 replace any first image data corresponding to an abnormal document area with third image data, the third image data being generated by adjusting at least brightness of any second image data corresponding to the abnormal document area.

16. The non-transitory computer-readable recording medium according to claim 15, wherein the image reading apparatus further includes a dimming element in the carriage, the dimming element being slidable along the sub-scanning path, the dimming element being semitransparent and reducing the luminescence level of the capturing light directed on the document by being positioned between the LED and the document; wherein
 the dimming element is configured to slide into between the LED and the document after the carriage moves to a path distal end in the first direction, and slide into a position away from between the LED and the document after the carriage moves to a path distal end in the second direction.

17. The non-transitory computer-readable recording medium according to claim 15, wherein the image correction unit is configured to reduce the luminescence level of the capturing light directed on the document by reducing electric power supplied to the LED in the movement of the carriage in the second direction compared with electric power supplied to the LED in the movement of the carriage in the first direction.

18. The non-transitory computer-readable recording medium according to claim 15, wherein the image correction unit is configured to detect document areas where the reflected light is abnormal by comparing the first image data with the second image data with respect to each scanning line in a main-scanning direction.

19. The non-transitory computer-readable recording medium according to claim 15, wherein the image correction unit is configured to detect document areas where the reflected light is abnormal by comparing difference data indicative of at least a difference in level of brightness between neighboring scanning lines in a main-scanning direction in the first image data, with such difference data for the second image data.

20. The non-transitory computer-readable recording medium according to claim 15, wherein the image correction unit is configured to compare fourth image data with difference data indicative of at least a difference in level of brightness between neighboring scanning lines in a main-scanning direction in the first image data to detect document areas where the reflected light is abnormal, the fourth image data being generated by adjusting at least brightness of the difference data in the second image data.

* * * * *